United States Patent Office 3,202,648
Patented Aug. 24, 1965

3,202,648
SCORCH-RESISTANT POLYETHYLENE
COMPOSITIONS AND METHOD
Harold K. Latourette, Pennington, and Ernest R. Gilmont,
Princeton, N.J., assignors to FMC Corporation, New
York, N.Y., a corporation of Delaware
No Drawing. Filed Nov. 8, 1961, Ser. No. 150,875
23 Claims. (Cl. 260—94.9)

This invention relates to the crosslinking of polymers of ethylene, and particularly to a method and compositions for providing crosslinked polyethylenes which operate with improved freedom from precure, or scorch, on processing.

Polymers of ethylene having a range of properties have been provided commercially. They extend from the soft polymers, which heat-soften at temperatures below the point of boiling of water, to the harder polymers which heat-soften well above the boiling point of water. The soft polymers are of particular value where pliability and ready formability are of advantage, whereas the harder polymers find use in applications where their hardness and ability to withstand deformation at moderately elevated temperatures are of importance.

There are many applications, however, such as wire coatings, some pipe, cable, and the like, in which not even the hardest and most heat-resistant polymers are satisfactory. Applications of this type require a polymer having hardness coupled with resilience, resistance to chemical degradation and degradation by sunlight, a softening temperature higher than that of any commercial polyethylene, and other properties not found even in the strongest and hardest polyethylenes.

Attempts to improve the ethylene polymers in these regards by incorporating substantial amounts of fillers or modifiers into them have not met with success, since the physical properties of the polymers are degraded by the fillers.

In the search for improved ethylene polymers it was found that they can be modified and improved by crosslinking, suitably by irradiation or by chemicals capable of liberating free radicals, e.g. peroxides, which promote the crosslinking. Peroxides useful for promoting crosslinking include some organic mono- and diperoxides having one or more tertiary carbon atoms attached to the peroxide linkage. Monoperoxides found useful are dicumyl peroxide, di-tert-butyl peroxide and other tertiary monoperoxides such as those named in U.S. Patent 2,888,424; diperoxides of particular utility are bis(tert-alkylperoxy)-alkanes. Preferred peroxides of this type are named in U.S. Patent 2,916,481.

An important result of the crosslinking of polyethylene with organic peroxides is that it permits the inclusion of fillers, for example, carbon black, silica, alumina, calcium silicate and the like, in the polymers without degradation of polymer properties. Properties imparted by these fillers, for example degradation resistance, stiffness and the like, together with the properties imparted by crosslinking itself, such as improved physical strength, elevated softening temperatures and chemical and aging resistance, permit much wider use of the basic material, extending its use to such applications as piping, cable covers, and the like, where temperature resistance, stability, high physical strength and other properties are important.

Despite the desirability of curing polyethylene, however, the use of peroxides has created a serious problem in compounding. The peroxide is normally incorporated into the polyethylene at an elevated temperature at which the polyethylene is softened and the peroxide can be worked into it. It has been found that when a peroxide-polyethylene mixture is subjected to the temperatures necessary for compounding, the peroxide is activated and causes precuring or scorching of the polyethylene. This undesirable side effect, which is particularly aggravated when the compounded polyethylene is subjected to high temperatures before curing, as in an extruder, results in non-uniform characteristics in the product eventually produced from the compound. This is because precured spots of material do not flow properly on forming, for example on molding or extruding, and the product is non-uniform in appearance and properties.

Being aware of this scorch problem, the art has directed itself to discovering peroxides which have as little tendency as possible to cause scorch. The bisperoxides of U.S. Patent 2,916,481 have been found to have a substantially reduced tendency to scorch when compounded with polyethylenes, as compared with previously available peroxides such as dicumyl peroxide. However, even these preferred bisperoxides are not completely satisfactory in this regard, and it has been desired to find a means of reducing scorching still further. It has been especially desired to find such a means which would not interfere with normal crosslinking of polyethylene with heat.

It is a feature of the present invention to provide a method for producing peroxide-crosslinked polyethylene, which reduces the scorching tendency of polyethylene compositions containing peroxide, and compositions useful in this method.

It is a further feature to provide such a method and compositions which do not interfere substantially with normal curing ability of the peroxides, or with the properties of the cured polyethylene product.

It has now been found, quite surprisingly that polyethylene can be compounded or blended with peroxides containing a saturated tertiary alkyl group on each peroxygen group at commercially useful elevated temperatures, without substantial scorching or precuring of the polyethylene, provided the compounding is carried out in the presence of about 0.1 to 4, and preferably 0.25 to 2, parts by weight for each 100 parts by weight of the polyethylene, of an alkyl, cycloalkyl, or aralkyl nitrite having 5 to 18, and preferably 5 to 10, carbon atoms. The nitrite greatly reduces the tendency of the peroxide to be activated, and to cure or scorch the polyethylene before the curing operation, while at the same time not interfering with production of excellent cured properties in the cured polyethylene at the desired time.

The nitrites have been found to be effective in reducing scorch with peroxides having at least one saturated tertiary alkyl group of 4 to 8 carbon atoms, and preferably 4 to 5 carbon atoms, attached to a peroxygen group in the peroxide molecule. These peroxides may be the bis(tert-alkylperoxy)-alkanes, -alkenes and -alkynes, and include the bis(tert-alkylperoxy)-alkanes taught in U.S. Patent 2,916,481; such peroxides have the formula

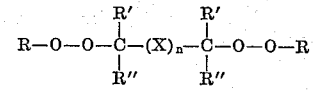

where X is —CH$_2$—CH$_2$—, —CH=CH—, or —C≡C, $n$ is an integer from 1 to 2, R is a tertiary alkyl group having 4 to 8 carbon atoms, and R' and R" are hydrocarbon radicals each having 1 to 8 carbon atoms from the group consisting of individual unconnected hydrocarbon radicals and alkylene radicals connected to form cycloalkylene radicals. The monoperoxides containing a saturated tertiary alkyl group having 4 to 8, and preferably 4 to 5, carbon atoms attached to the peroxygen group, and in which the other group attached to the peroxygen group may be an alkyl, cycloalkyl or aralkyl group, also are caused to have a reduced scorch tendency by the herein nitrites.

The nitrites have been found, on the other hand, not to be effective in reducing scorch with peroxides outside this class. Thus the nitrites do not improve scorch when used with dicumyl peroxide, an organic peroxide not having a saturated tertiary alkyl group attached to the peroxygen group.

Typical bisperoxides of the type improved with the present nitrites are 2,5-bis(tert-amylperoxy)-2,5-dimethylhexane, 2,5 - bis(tert - butylperoxy) - 2,5-dimethylhexane, 1,1'-ethylenebis[1 - (tert - amylperoxy)cyclohexane], 2,5-bis(tert - butylperoxy) - 2,5 - diphenylhexane, 2,5-bis(tert - butylperoxy) - 2,5 - dimethylhexyne and 2,5-bis(tert - butylperoxy) - 2,5 - dimethylhexene, 2,7 - bis-(tert - butylperoxy) - 2,7 - dimethyloctane, and 3,6-bis(tert-amylperoxy) - 3,6 - dimethyloctane.

Typical monoperoxides useful with the present nitrites include tert-butyl-cumyl peroxide, di(tert-butyl)peroxide, tert-butyl-tert-amyl peroxide, tert-butyl-tert-octyl peroxide, 1(tert - amylperoxy) - 1 - methylcyclohexane, and bis(3-ethyl-3-pentyl) peroxide.

The nitrites useful herein are the alkyl, cycloalkyl, and aralkyl nitrites having 5 to 18 carbon atoms and preferably 5 to 10 carbon atoms. They may contain one or more nitrite groups. Use of nitrites having less than 5 carbon atoms is undesirable because these nitrites have high volatilities, and would be lost from the composition under common compounding conditions. Nitrites having more than 18 carbon atoms are not easily obtained and for that reason are not preferred for use herein. Typical useful nitrites are tert-amyl nitrite, tert-decyl nitrite, isoamyl nitrite, 2-ethylhexyl nitrite, cumyl nitrite, cetyl nitrite, stearyl nitrite, cyclohexyl nitrite and the like.

The polyethylene-peroxide compositions which contain the present nitrites may also include other additives such as those normally employed in plastics compositions. Useful additives include fillers, other polymers, coloring agents, antioxidants, and where desired, other crosslinking agents. The peroxide may be introduced alone, or it may be adsorbed on such fillers as silica, carbon black, calcium carbonate, and the like and introduced into the polyethylene compound in this fashion.

The peroxide normally is employed in the ethylene polymer in the amount of about 0.1 to 10%, and preferably 0.5 to 3% by weight of polyethylene, and preferably introduced into the peroxide composition by mechanical blending at a temperature at which the polyethylene is softened and workable. This temperature will be about 240° to 315° F., depending on polymer softening temperature. Suitable equipment for the blending of the compositions include two-roll mills, Banbury mixers, and the like.

Incorporation of the nitrite into the polyethylene composition will normally accompany introduction of the peroxide, although it can be introduced first or at any other point during the compounding. It will be apparent that for maximum effect, the nitrite should be present during substantially the full period of mixing of the peroxide with the polyethylene. Both liquid and solid nitrites having the present chemical characteristics are available, and choice of a liquid or a solid nitrite may be made on the basis of the particular application.

The nitrite is employed in the amount of 0.1 to 4, and preferably 0.25 to 2, parts by weight for each 100 parts by weight of polyethylene. Use of less than the minimum does not effect satisfactory scorch-improvement, whereas use of more than about 4 parts by weight does not confer substantial additional scorch-resistance and is not necessary.

Crosslinking of the compositions of the invention frequently will be carried out simultaneously with their formation into shaped products, such as molded, extruded or calendered articles, for example, wire, cable, pipe and sponge. The shaping and crosslinking may be effected at a temperature of about 320° to 450° F. Curing time will vary between a few seconds at high temperatures for thin sections, to an hour or more at lower temperatures and for thick workpieces.

The curing and shaping operations need not be conducted simultaneously, however. It has been found advantageous in some applications to preshape the compositions and to crosslink them in a separate operation. One very useful forming and crosslinking process is that used in providing polyethylene insulation on wires and cables. In this process the compounded polyethylene is extruded onto a cable wire and immediately thereafter is cured by exposure to live steam at 350° to 450° F. for approximately one to four minutes. Other common methods of shaping and curing plastics and rubber compositions may be employed with the present polyethylene and peroxide compositions.

The following examples are given by way of illustration only, and are not to be deemed limitative in any way. Percent compression values reported in the examples were determined on a Williams Plastometer at 250° F. Four 0.5" x .075" specimens were plied to provide a test sample, which was inserted in the Plastometer, and the Plastometer containing the specimen and a 10 kilogram weight on the sample was placed in an oven for 30 minutes at the indicated temperature. Percent compressions were determined immediately on removal of the specimens from the oven. These percent compression values are all higher than corresponding values reported in U.S. Patent 2,916,481; in the patent results are reported for a Modified Williams test in which the weight on the samples is 5 kgs., and the sample is 1" square. The present test had been adopted because it shows degree of cure more precisely.

Mooney values were determined in a Mooney Shear Disc Viscometer of the type described in ASTM Test Method D1646–59T, employing the large rotor described therein. The tests were run at 270° F. The Mooney values reported prepresent the total time elapsed between the start of the tests and the observance of a reading five points above the lowest value. High Mooney values denote a low degree of scorch.

EXAMPLE I(a)

One hundred grams of polyethylene having a density of 0.92 and a number average molecular weight of 14,000 was blended with 50 g. of Thermax, a soft semi-reinforcing medium thermal carbon having a specific gravity of 1.80 and obtained by the thermal decomposition of natural gas, on a No. B Banbury mill at 250° F. for 10 minutes. This mixture was transferred to a two-roll rubber mill. Two grams of 2,5-bis(tert-butylperoxy)-2,5-dimethylhexane and 0.5 gram of tert-decyl nitrite were added together on the mill. Following this addition, the blend was milled for 3 minutes with cutting.

The uncured batch was removed from the mill and cooled to room temperature. Portions of the batch were molded and cured at 340° F. for 20 minutes to provide 5" x 6" x .075" cured slabs. The cured slabs were cut into dumbbell test specimens and 1-inch test samples. A further portion of the uncured batch was provided for testing in the Mooney Shearing Disc Viscometer.

Test samples containing no nitrite were prepared for comparison with the nitrite-containing test specimens; they contained peroxide and were prepared in the same fashion as were the nitrite samples, with the exception that they contained no nitrite. The products were tested with the following results.

| Percent Nitrite | Compression,[1] percent | 10% Modulus, p.s.i. | Tensile, p.s.i. | Elongation at break, percent | Shore D Hardness | Mooney Value |
|---|---|---|---|---|---|---|
| 0 | 17 | 1,240 | 2,420 | 350 | 54 | 35 |
| 0.5 | 17 | 1,320 | 2,360 | 360 | 53 | 53 |

[1] A sample of polyethylene was compounded as described above, but in the absence of peroxide and nitrite. Following molding at 340° F. for 20 minutes it had a percent compression of 65, indicating that the polyethylene composition flows at the test temperature when no curing agent is present.

EXAMPLE I(b)

*Peroxide not affected by the nitrite*

Polyethylene compositions containing the ingredients of the compositions of Example I(a) above, but having in place of the peroxide employed therein 1.7 g. of dicumyl peroxide, were prepared by the procedure recited in that example. The Mooney Values of these compositions were 16½ minutes, in both the nitrite-containing composition and that containing no nitrite, which indicated that both had a considerably greater tendency to scorch than did the corresponding blend of polyethylene with the peroxide and nitrite of Example I(a), and that the nitrite had no effect on the scorching tendency of the dicumyl peroxide sample.

EXAMPLE II

One hundred gram samples of polyethylene having a density of 0.92 and a number average molecular weight of 14,000 were each mixed with 100 g. of Thermax, a soft semi-reinforcing medium thermal carbon having a specific gravity of 1.80 and obtained by the thermal decomposition of natural gas, on a No. B Banbury mill at 250° F. for 10 minutes. These mixtures were transferred to two-roll rubber mills. Two grams of 2,5-bis-(tert-butylperoxy)-2,5-dimethylhexane and 0.5 g., 1.0 g. and 2.0 g. portions respectively of isoamyl nitrite were added on the mills to the batches. Following these additions, the blends were milled for three minutes with cutting.

The batches were then treated in the same fashion as the batch in Example I(a) was treated, and tests of the material against blanks, containing no nitrite, were made to determine the percent compressions and Mooney Values, indicating degree of cure and scorch, as shown in the following table:

| Percent Nitrite | Compression, Percent | Mooney Value |
|---|---|---|
| 0 | 25 | 42 |
| 0.5 | 24 | 52 |
| 1.0 | 23 | 61 |
| 2.0 | 23 | 70 |

EXAMPLE III

The procedure of Example II was followed, using 0.5 g. of 2-ethylhexyl nitrite in place of the isoamyl nitrite employed in Example II. The products of this example were tested with the following results:

| Percent Nitrite | Compression, Percent | Mooney Value |
|---|---|---|
| 0 | 25 | 42 |
| 0.5 | 23 | 59 |

EXAMPLE IV

The procedure of Example II was followed using 1.0 g. of tert-amyl nitrite in place of the isoamyl nitrite of Example II. The products of this example were tested with the following results:

| Percent Nitrite | Compression, Percent | Mooney Value |
|---|---|---|
| 0 | 25 | 42 |
| 0.5 | 23 | 53 |

EXAMPLE V

The procedure of Example II was followed, using 0.5 g. of cumyl nitrite in place of the isoamyl nitrite of Example II. The products of this example were tested with the following results:

| Percent Nitrite | Compression, Percent | Mooney Value |
|---|---|---|
| 0 | 25 | 42 |
| 0.5 | 23 | 80 |

EXAMPLE VI

The procedure of Example II was followed using 2 g. of 2,7-bis(tert-butylperoxy)-2,7-dimethyloctane carried on 2 g. of a mixture of 3 parts Hi-Sil 233, a finely ground silica having an average particle size of 0.022 micron, and 1 part of Atomite, a finely ground calcium carbonate having an average particle size of 2.5 microns, in place of the peroxide employed in Example II and employing 0.5 g. of 2-ethylhexyl nitrite in place of the isoamyl nitrite employed in Example II. The Hi-Sil is produced by Columbia Southern Division of Pittsburg Plate Glass Co., and the Atomite is produced by Thompson-Weinman & Co. The products of this example were tested with the following results:

| Percent Nitrite | Compression, Percent | Mooney Value |
|---|---|---|
| 0 | 21 | 32½ |
| 0.5 | 30 | 48 |

EXAMPLE VII

The procedure of Example II was followed, employing 2 g. of tert-butyl cumyl peroxide in place of the peroxide in Example II and employing 0.5 g. of isoamyl nitrite in place of the nitrite of Example II. The products of this example were tested with the following results:

| Percent Nitrite | Compression, Percent | Mooney Value |
|---|---|---|
| 0 | 15 | 32 |
| 0.5 | 15 | 50 |

EXAMPLE VIII

The procedure of Example II was followed using 0.5 g. of cyclohexyl nitrite in place of the isoamyl nitrite of Example II. The products of this example were tested with the following results:

| Percent Nitrite | Compression, Percent | Mooney Value |
|---|---|---|
| 0 | 26 | 41 |
| 0.5 | 27 | 53 |

EXAMPLE IX

One hundred grams of the polyethylene of Example I was mixed at 250° F. with 2 g. of 2,5-bis(tert-butylperoxy)-2,5-dimethylhexane and 1 g. of cumyl nitrite on a two-roll rubber mill. Following the addition of all of the peroxide and nitrite, the batch was milled with cutting for 3 minutes.

This batch and a corresponding batch having no nitrite were tested for percent compression and scorch, with the following results:

| Percent Nitrite | Compression, Percent | Mooney Value |
|---|---|---|
| 0 | 17 | 38 |
| 1.0 | 16 | 51 |

EXAMPLE X

Substitution of 2,5-bis(tert-butylperoxy)-2,5-dimethylhexene, 2,5 - bis(tert-amylperoxy) - 2,5 - dimethylhexyne, 1,1' - ethylenebis[1-(tert - amylperoxy) cyclohexane], or di-tert-butyl peroxide for the peroxides used in Examples I–IX above, provides compositions having excellent resistance to scorch, and which cure to low-compression products.

It will be seen from the above examples that the present nitrites impart to polyethylene compositions containing peroxides having a saturated tertiary alkyl group, a high degree of resistance to scorch (Mooney Value). At the same time, they do not interfere with efficient crosslinking (percent compression) of the compositions when they are subjected to curing temperatures, and this combination of properties extends the usefulness of peroxide-crosslinked polyethylene compositions to areas in which they presently either can not be used, or in which they can be used only with extreme care in operation.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Scorch resistant composition useful in the production of crosslinked polyethylene, consisting essentially of 100 parts by weight of polyethylene, 0.1 to 10 parts by weight of an organic peroxide from the group consisting of (a) bisperoxides having the following formula:

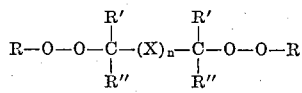

wherein X is —$CH_2$—$CH_2$, —CH=CH—, or —C≡C—, $n$ is an integer from 1 to 2, R is a tertiary alkyl group having 4 to 8 carbon atoms, and R' and R'' are hydrocarbon radicals each having 1 to 8 carbon atoms from the group consisting of individual unconnected hydrocarbon radicals and alkylene radicals connected to form cycloalkylene radicals, and (b) monoperoxides containing attached to the peroxygen group a saturated tertiary alkyl group having 4 to 8 carbon atoms and in which the other group attached to the peroxygen group is from the group consisting of alkyl, cycloalkyl and aralkyl groups, and 0.1 to 4 parts by weight of a nitrite from the group consisting of the alkyl, cycloalkyl and aralkyl nitrites having 5 to 18 carbon atoms.

2. Composition of claim 1 in which the nitrite has 5 to 10 carbon atoms and is employed in the amount of 0.25 to 2.0 parts by weight.

3. Composition of claim 1 in which the nitrite is tert-decyl nitrite.

4. Composition of claim 1 in which the nitrite is iso-amyl nitrite.

5. Composition of claim 1 in which the nitrite is 2-ethylhexyl nitrite.

6. Composition of claim 1 in which the nitrite is tert-amyl nitrite.

7. Composition of claim 1 in which the nitrite is cumyl nitrite.

8. Composition of claim 1 in which the peroxide has the following formula:

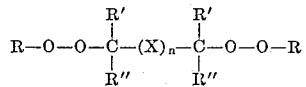

wherein X is —$CH_2$—$CH_2$, —CH=CH—, or —C≡C—, $n$ is an integer from 1 to 2, R is a tertiary alkyl group having 4 to 8 carbon atoms, and R' and R'' are hydrocarbon radicals each having 1 to 8 carbon atoms from the group consisting of individual unconnected hydrocarbon radicals and alkylene radicals connected to form cycloalkylene radicals.

9. Composition of claim 1 in which the peroxide is 2,5-bis(tert-butylperoxy)-2,5-dimethylhexane.

10. Composition of claim 1 in which the peroxide is 2,7-bis(tert-butylperoxy)-2,7-dimethyloctane.

11. Composition of claim 1 in which the peroxide is 2,5-bis(tert-amylperoxy)-2,5-dimethylhexane.

12. Method of crosslinking polyethylene, comprising mixing together 100 parts by weight of polyethylene, 0.1 to 10 parts by weight of an organic peroxide from the group consisting of (a) bisperoxides having the following formula:

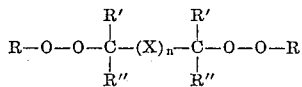

wherein X is —$CH_2$—$CH_2$, —CH=CH—, or —C≡C—, $n$ is an integer from 1 to 2, R is a tertiary alkyl group having 4 to 8 carbon atoms, and R' and R'' are hydrocarbon radicals each having 1 to 8 carbon atoms from the group consisting of individual unconnected hydrocarbon radicals and alkylene radicals connected to form cycloalkylene radicals, and (b) monoperoxides containing attached to the peroxygen group a saturated tertiary alkyl group having 4 to 8 carbon atoms and in which the other group attached to the peroxygen group is from the group consisting of alkyl, cycloalkyl and aralkyl groups, and 0.1 to 4 parts by weight of a nitrite from the group consisting of the alkyl, cycloalkyl and aralkyl nitrites having 5 to 18 carbon atoms, and thereafter heating the resulting mixture to effect crosslinking of said polyethylene.

13. Method of claim 12 in which the nitrite has 5 to 10 carbon atoms and is employed in the amount of 0.25 to 2.0 parts by weight.

14. Method of claim 12 in which the nitrite is tert-decyl nitrite.

15. Method of claim 12 in which the nitrite is isoamyl nitrite.

16. Method of claim 12 in which the nitrite is 2-ethylhexyl nitrite.

17. Method of claim 12 in which the nitrite is tert-amyl nitrite.

18. Mthod of claim 12 in which the nitrite is cumyl nitrite.

19. Method of claim 12 in which the peroxide has the following formula:

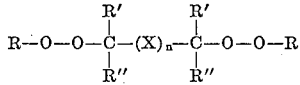

wherein X is —$CH_2$—$CH_2$, —CH=CH—, or —C≡C—, $n$ is an integer from 1 to 2, R is a tertiary alkyl group having 4 to 8 carbon atoms, and R' and R'' are hydrocarbon radicals each having 1 to 8 carbon atoms from the group consisting of individual unconnected hydrocarbon radicals and alkylene radicals connected to form cycloalkylene radicals.

20. Method of claim 12 in which the peroxide is 2,5-bis(tert-butylperoxy)-2,5-dimethylhexane.

21. Method of claim 12 in which the peroxide is 2,7-bis(tert-butylperoxy)-2,7-dimethyloctane.

22. Method of claim 12 in which the peroxide is 2,5-bis(tert-amylperoxy)-2,5-dimethylhexane.

23. Composition useful in crosslinking polyethylene comprising 0.1 to 10 parts by weight of an organic peroxide from the group consisting of (a) bisperoxides having the following formula:

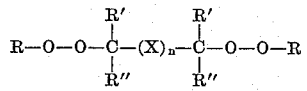

wherein X is $-CH_2-CH_2-$, $-CH=CH-$, or $-C\equiv C-$, $n$ is an integer from 1 to 2, R is a tertiary alkyl group having 4 to 8 carbon atoms, and R' and R'' are hydrocarbon radicals each having 1 to 8 carbon atoms from the group consisting of individual unconnected hydrocarbon radicals and alkylene radicals connected to form cycloalkylene radicals and (b) monoperoxides containing attached to the peroxygen group a saturated tertiary alkyl group having 4 to 8 carbon atoms and in which the other group attached to the peroxygen group is from the group consisting of alkyl, cycloalkyl and aralkyl groups, and 0.1 to 4 parts by weight of a nitrite from the group consisting of the alkyl, cycloalkyl and aralkyl nitrites having 5 to 18 carbon atoms.

No references cited.

JOSEPH L. SCHOFER, *Primary Examiner.*